(12) United States Patent
Mukhtarov et al.

(10) Patent No.: US 10,677,976 B2
(45) Date of Patent: Jun. 9, 2020

(54) MOBILE DEVICE CAPABLE OF DISPLAYING HOLOGRAM AND HOLOGRAM DISPLAY METHOD

(71) Applicant: SAMSUNG ELECTRONICS CO., LTD., Suwon-si (KR)

(72) Inventors: Farid Mukhtarov, Suwon-si (KR); Ki-hyung Kang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1146 days.

(21) Appl. No.: 14/487,269

(22) Filed: Sep. 16, 2014

(65) Prior Publication Data

US 2015/0220058 A1 Aug. 6, 2015

(30) Foreign Application Priority Data

Feb. 3, 2014 (KR) .......................... 10-2014-0012260

(51) Int. Cl.
*G02B 5/32* (2006.01)
*G03H 1/22* (2006.01)
*G03H 1/30* (2006.01)

(52) U.S. Cl.
CPC .............. *G02B 5/32* (2013.01); *G03H 1/2286* (2013.01); *G03H 1/30* (2013.01);
(Continued)

(58) Field of Classification Search
CPC .. G02B 27/0103; G02B 27/01; G02B 5/1857; G02B 2027/0174; G03H 1/202; G03H 1/265; G03H 1/28; G03H 1/0248; G03H 2001/2207; G03H 1/2239; G03H 1/2242; G03H 1/2286; G03H 1/30; G03H 1/2202; G03H 1/26; G03H 1/00; G03H 1/22;
(Continued)

(56) References Cited

U.S. PATENT DOCUMENTS 6,580,529 B1 * 6/2003 Amitai ..................... G02B 5/32
359/13
7,068,404 B2 * 6/2006 Ouchi ................ G02B 27/0172
345/7
(Continued)

FOREIGN PATENT DOCUMENTS

EP 1825306 B1 4/2012
KR 10-2007-0036692 A 4/2007

OTHER PUBLICATIONS

Communication dated Feb. 10, 2020 issued by the Korean Intellectual Property Office in counterpart Korean Application No. 10-2014-0012260.

*Primary Examiner* — Stephone B Allen
*Assistant Examiner* — Jyotsna V Dabbi
(74) *Attorney, Agent, or Firm* — Sughrue Mion, PLLC

(57) ABSTRACT

A mobile device is provided which is capable of displaying a hologram. The mobile device includes a main body including a screen; a light guide member disposed above the screen; an entrance optical member disposed on a surface of the light guide member; and an image hologram disposed on a surface of the light guide member and laterally spaced apart from the entrance optical member. When an area of the screen corresponding to the entrance optical member emits a light, a holographic image stored in the image hologram is displayed above the light guide member.

19 Claims, 12 Drawing Sheets

(52) U.S. Cl.
CPC ............. *G03H 2001/2231* (2013.01); *G03H 2001/2234* (2013.01); *G03H 2222/18* (2013.01); *G03H 2223/16* (2013.01)

(58) Field of Classification Search
CPC .. G03H 1/0005; G03H 1/0252; G03H 1/0272; G03H 1/2205; G03H 2001/2231; G03H 2001/2234; G03H 2001/16; G03H 2001/18; G03H 2001/306; G03H 2001/2242; G03H 2001/2239; G03H 2222/18; G03H 2223/16; G03H 2250/00; G03H 2250/42; G03H 2270/00; G03H 2001/55
USPC .............................................. 359/12, 15, 34
See application file for complete search history.

(56) References Cited

U.S. PATENT DOCUMENTS

| | | |
|---|---|---|
| 7,502,168 B2 | 3/2009 | Akutsu et al. |
| 7,573,640 B2 | 8/2009 | Nivon et al. |
| 2007/0070504 A1 | 3/2007 | Akutsu et al. |
| 2010/0079356 A1* | 4/2010 | Hoellwarth .......... G02B 27/017 345/8 |
| 2010/0157400 A1* | 6/2010 | Dimov ................... G02B 5/188 359/13 |
| 2012/0069031 A1 | 3/2012 | Bita et al. |
| 2013/0114119 A1 | 5/2013 | Perlot et al. |
| 2013/0279017 A1 | 10/2013 | Amitai |

* cited by examiner

MOBILE DEVICE CAPABLE OF DISPLAYING HOLOGRAM AND HOLOGRAM DISPLAY METHOD

CROSS-REFERENCE TO RELATED APPLICATION

This application claims the benefit under 35 U.S.C. § 119(a) from Korean Patent Application No. 10-2014-0012260 filed Feb. 3, 2014 in the Korean Intellectual Property Office, the disclosure of which is incorporated herein by reference in its entirety.

BACKGROUND

1. Field

Apparatuses and methods consistent with exemplary embodiments relate to a mobile device capable of displaying a hologram and a hologram display method that can display a holographic image by using a light emitted from a screen of a mobile device.

2. Description of the Related Art

According to recent technological developments, many apparatuses that can display three-dimensional holographic images have been developed and used.

Many hologram display apparatuses use laser diodes, light emitting diodes, organic light emission diodes, etc. as a light source for illuminating the hologram. However, such hologram display apparatuses have a weakness in that they are large because they are provided with a separate light source having its own power supply. Accordingly, there is a problem that these hologram display apparatuses are not appropriate to be used in mobile devices, such as smart phones, that are small in size and light in weight.

Accordingly, development of a hologram display apparatus that can display a holographic image without a separate light source, and therefore, can be used in mobile devices such as smart phones is desired.

SUMMARY

One or more exemplary embodiments described herein may overcome the above drawbacks and other problems associated with hologram display apparatuses described above. One or more exemplary embodiments may provide a mobile device, capable of displaying a hologram that can display a holographic image by using a light emitted from a screen of the mobile device instead of a separated light source, and a hologram display method thereof.

An aspect of an exemplary embodiment provides a mobile device capable of displaying a hologram. The mobile device may include a main body comprising a screen; a light guide member disposed above the screen and configured to allow a light to travel in one direction; an entrance optical member disposed on the light guide member; and an image hologram spaced apart from the entrance optical member and disposed on the light guide member, wherein if an area of the screen corresponding to the entrance optical member emits light, a holographic image stored in the image hologram is displayed above the light guide member.

The light guide member may be disposed inside a flip cover that is configured to substantially cover or expose the screen and includes an opening, and the image hologram may be disposed in a portion of the light guide member corresponding to the opening in the flip cover.

The entrance optical member and the image hologram may be disposed on the same surface of the light guide member.

The entrance optical member and the image hologram may be disposed on a bottom surface of the light guide member; the entrance optical member may be a transmissive hologram optical element; and the image hologram may be a reflective hologram.

The entrance optical member and the image hologram may be disposed on a top surface of the light guide member; the entrance optical member may be a reflective hologram optical element; and the image hologram may be a transmissive hologram.

The entrance optical member and the image hologram may be disposed on opposite surfaces of the light guide member.

The entrance optical member may be disposed on a bottom surface of the light guide member; the image hologram may be disposed on a top surface of the light guide member; the entrance optical member may be a transmissive hologram optical element; and the image hologram may be a transmissive hologram.

The entrance optical member may be disposed on a top surface of the light guide member; the image hologram may be disposed on a bottom surface of the light guide member; the entrance optical member may be a reflective hologram optical element; and the image hologram may be a reflective hologram.

The entrance optical member may include at least one of a hologram optical element, a diffraction grating, and a prismatic sheet.

The image hologram may store a complete three-dimensional holographic image.

The entrance optical member may include at least two entrance optical elements corresponding to the image hologram.

The image hologram may store a color image, and the at least two entrance optical elements may include an entrance optical element for red light, an entrance optical element for blue light, and an entrance optical element for green light to refract the red light, the blue light, and the green light, respectively.

The image hologram may include a plurality of image holograms, and the entrance optical member may include a plurality of entrance optical members corresponding to the plurality of image holograms.

The plurality of image holograms may respectively be coordinated with a plurality of specific events that may occur in the main body.

If the image hologram is not supplied with a proper light through the entrance optical member, the image hologram may be transparent.

The light guide member may have a size corresponding to the size of the opening in the flip cover.

According to an aspect of another exemplary embodiment, a hologram display method may be provided for a mobile device, wherein the mobile device includes a flip cover, an image hologram, and a light guide member that are disposed in the flip cover. The hologram display method may include determining whether there is information to be displayed with the image hologram; determining, if there is information to be displayed with the image hologram, a state of the flip cover; determining, if the flip cover is closed, which group of at least one group the information belongs to; allowing an area of a screen of the mobile device corresponding to a group to which the information is determined to belong to emit light; and displaying a holographic image stored in the image hologram using the light emitted from the area of the screen.

The hologram display method may include displaying, if the flip cover is open, the information on the screen of the mobile device.

The mobile device may be a smart phone, and the information to be displayed with the image hologram may be information regarding a phone call that is received in the smart phone from a specific person or a specific group.

Other objects, advantages and salient features of exemplary embodiments will become apparent from the following detailed description taken in conjunction with the annexed drawings.

BRIEF DESCRIPTION OF THE DRAWINGS

These and/or other exemplary aspects and advantages will become apparent and more readily appreciated from the following description of exemplary embodiments, taken in conjunction with the accompanying drawings in which.

Throughout the drawings, like reference numerals refer to like parts, components and structures.

DETAILED DESCRIPTION

Hereinafter, certain exemplary embodiments will be described in detail with reference to the accompanying drawings.

The matters defined herein, detailed constructions and elements thereof are provided to assist in a comprehensive understanding of the embodiments. Thus, it is apparent that exemplary embodiments may be carried out without those defined matters. Also, descriptions of well-known functions or constructions are omitted to provide a clear and concise description of the exemplary embodiments. Further, dimensions of various elements in the accompanying drawings may be arbitrarily increased or decreased for assisting in a comprehensive understanding.

Figure 1:
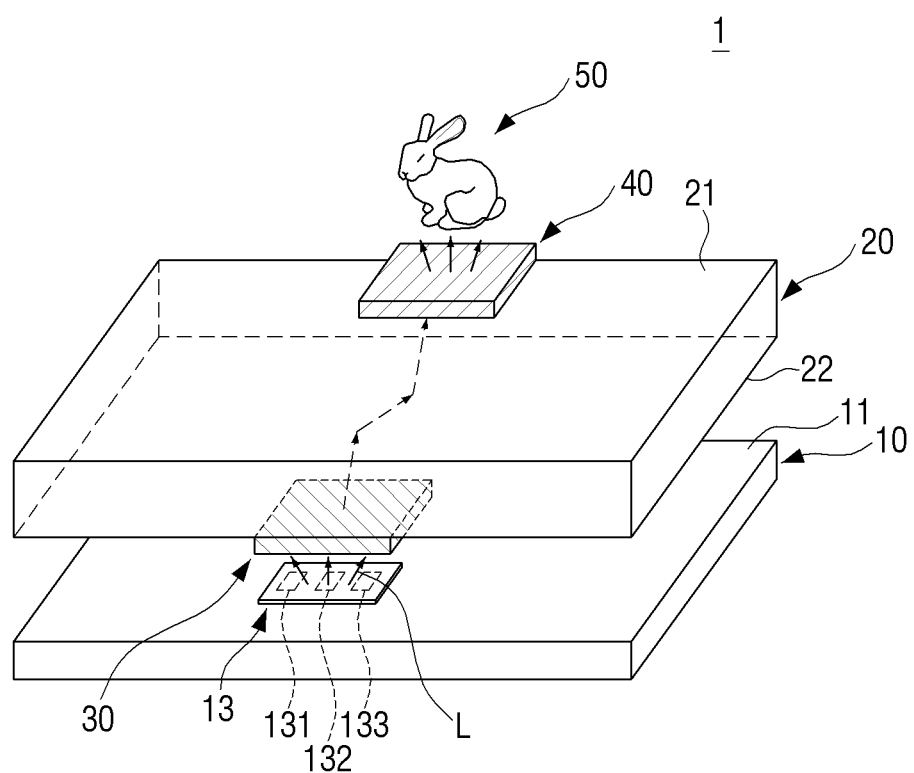
FIG. 1 is a perspective view conceptually illustrating a mobile device capable of displaying a hologram according to an exemplary embodiment.
Figure 2:
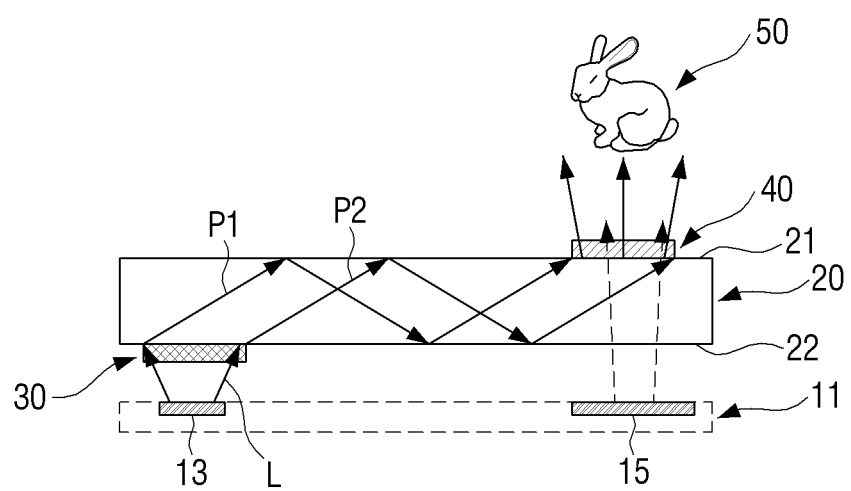
FIG. 2 is a cross-sectional view conceptually illustrating the mobile device capable of displaying a hologram of FIG. 1.

FIG. 1 is a perspective view conceptually illustrating a mobile device capable of displaying a hologram according to an exemplary embodiment, and FIG. 2 is a cross-sectional view conceptually illustrating the mobile device capable of displaying a hologram of FIG. 1.

Referring to FIGS. 1 and 2, a mobile device 1 capable of displaying a hologram according to an exemplary embodiment may include a main body 10, a light guide member 20, an entrance optical member 30, and an image hologram 40.

A screen 11 that can output data, such as images, characters, etc., is provided in a front surface of the main body 10. A controller (not illustrated) that controls the screen 11 to output data is provided inside the main body 10. The controller is configured to be able to turn on or off a predetermined area 13 of the screen 11. If the controller turns on the predetermined area 13 of the screen 11, the predetermined area 13 emits light sufficient for illuminating the image hologram 40 so as to display a holographic image 50. The predetermined area 13 may include a single pixel or a plurality of pixels of the screen 11. The predetermined area 13 of the screen 11 may be determined to be a sufficient area to emit a light L that illuminates the image hologram 40 so as to display a holographic image 50. Also, the controller may control the predetermined area 13 of the screen 11 to emit light in only one color (monochromatic light), among light of various colors that can be output by the screen 11. For example, the controller may control the predetermined area 13 of the screen 11 to emit red light.

Further, in addition to the aforementioned function, the controller can perform all the functions performed by a controller of a related art mobile device.

As the screen 11, one of a liquid crystal display (LCD) panel using light emitting diodes (LEDs) as a light emitting source, an organic light emitting diode display panel using organic light emitting diodes (OLEDs) as the light emitting source, and a laser display panel using laser diodes LDs as the light emitting source may be used.

The light guide member 20 is configured to guide the light, that is emitted from the screen 11 and enters the light guide member 20, through the entrance optical member 30 in one direction, and is disposed above the screen 11. The light guide member 20 may have a flat plate shape corresponding to the shape of the screen 11. The light guide member 20 is configured such that the upper surface 21 and lower surface 22 thereof are parallel to each other. Accordingly, as illustrated in FIG. 2, light that enters the inside of the light guide member 20 is totally internally reflected at both the upper surface 21 and the lower surface 22, so as to travel substantially in one direction within the light guide member 20. Also, because the light guide member 20 is made of a transparent material, a user can see images or characters that are displayed on an area 15 of the screen 11 below the light guide member 20.

The entrance optical member 30 is disposed on the lower surface 22 of the light guide member 20. The entrance optical member 30 is configured to refract light emitted from the screen 11 at a certain angle, and guide the light into the light guide member 20. The entrance optical member 30 may be disposed to be in contact with the screen 11 or spaced apart by a predetermined distance from the screen 11. Therefore, light rays L emitted in random directions from the screen 11 are turned into parallel light rays P1 and P2 by being refracted while passing through the entrance optical member 30. The light rays P1 and P2 then travel in a predetermined direction (e.g. to the right in FIG. 2) inside the light guide member 20.

The entrance optical member 30 may be any optical device which can turn the incoming light into a parallel light and cause the light to enter the light guide member 20 and travel in one direction by refracting or reflecting the light incident thereon at a certain angle. In FIGS. 1 and 2, the entrance optical member 30 refracts the incoming light. However, the entrance optical member 30 may also include an optical element that reflects the incoming light at a certain angle so as to reflect parallel light traveling in one direction. Accordingly, the entrance optical member 30 may include, for example, one or more of a prismatic sheet, diffraction gratings, and a hologram optical element. Such a hologram optical element may be formed so that it can refract or reflect incoming light at a desired angle or transmit only desired wavelengths of the incoming light. In the present embodiment, the hologram optical element 30 allows monochromatic light emitted in random directions from the screen 11 of the mobile device 1 to be used as illumination for the image hologram 40 by refracting the monochrome light so that it is parallel and transmitted at a certain angle and caused to enter the light guide member 20. The hologram optical element 30 may be formed by irradiating two coherent laser beams having the same wavelength onto a hologram recording medium. The hologram optical element 30 may be manufactured by conventional manufacturing methods; therefore, a detailed description thereof is omitted.

The image hologram 40, as illustrated in FIGS. 1 and 2, is disposed on the upper surface 21 of the light guide member 20, and is laterally spaced apart from the entrance optical member 30 by a predetermined distance such that light entering the light guide member 20 through the entrance optical member 30 must travel laterally down the light guide member 20 before being incident on and transmitted through the image hologram 40. As shown in FIG. 2, the image hologram 40 may be disposed on the upper surface 21 of the light guide member 20 opposite to the lower surface 22 on which the entrance optical member 30 is disposed, or alternatively, the image hologram 40 may be disposed on the same lower surface 22 of the light guide member 20 on which the entrance optical member 30 is disposed. The image hologram 40 stores a predetermined three-dimensional image. When receiving proper illumination from a light source, the three-dimensional holographic image stored in the image hologram 40 is displayed above the image hologram 40.

the phrase "three-dimensional holographic image" refers to a complete three-dimensional image in which, when a displayed image is viewed from a variety of directions, the image appears to be three-dimensional. For example, "complete three-dimensional image" refers to an image in which, when a user views the displayed image from a front side, the front of the image is seen; when the user views the displayed image from a back side, the back of the image is seen; when the user views the displayed image from a left or right side, the left or right side of the image is seen; and when the user views the displayed image from above, the top of the image is seen.

The image hologram 40 may be a transmissive image hologram or a reflective image hologram. A transmissive image hologram is formed to display a three-dimensional holographic image stored in the image hologram when illumination light passes through the image hologram. A reflective image hologram is formed to display a three-dimensional holographic image stored in the image hologram when illumination light is reflected by the image hologram.

The image hologram 40 may display a holographic image using monochrome light. The color of the light used as the illumination light is not limited. Accordingly, the color of the displayed holographic image may be determined by the color of the illumination light. For example, if red light is used as the illumination light, a red holographic image is displayed. If blue light is used as the illumination light, a blue holographic image is displayed.

In order to display holographic images of multiple colors using a single image hologram 40, the predetermined area 13 of the screen 11 corresponding to the entrance optical member 30 may be divided into a plurality of light emitting regions 131, 132, and 133 to emit monochrome light in different colors, as illustrated in FIG. 1. For example, if a holographic image 50 of three colors, for example, red, blue, and green, is to be displayed using a single image hologram 40, the predetermined area 13 of the screen 11 corresponding to the entrance optical member 30 is divided into three light emitting regions 131, 132, and 133 which can emit red light, blue light, and green light, respectively. Accordingly, a holographic image include three colors can be displayed by using a single image hologram 40. However, the number of colors that can be displayed by a single image hologram 40 is not limited thereto. The number of colors is determined by the number of colors that can be implemented by the screen 11 of the mobile device 1. For example, if the screen 11 of the mobile device 1 can emit monochrome light of N number of colors, the single image hologram 40 may be displayed as a holographic image 50 having N colors.

Further, the image hologram 40 may be transparent. Accordingly, when proper illumination is not supplied from the screen 11, a user cannot see the holographic image 50, but can see a portion 15 of the screen 11 which is disposed below the image hologram 40. In other words, when the holographic image 50 is not displayed, the image hologram 40 remains transparent, and a user can see images, etc. that are displayed on the screen 11 below the image hologram 40 and the light guide member 20.

The image hologram 40 may be manufactured by recording interference patterns generated by a laser beam (referred to as a reference beam) irradiated toward a hologram recording medium and a reflection beam (referred to as an object beam) reflected on an object, onto the hologram recording medium, where the object has the form of the desired resultant hologram image. Conventional technology may be used to manufacture the image hologram 40; therefore, a detailed description thereof is omitted.

As noted above, the image hologram 40 is disposed to be laterally spaced apart from the entrance optical member 30 by a predetermined distance. The distance between the image hologram 40 and the entrance optical member 30 may be determined according to the characteristics of the entrance optical member 30. In other words, the image hologram 40 may be disposed in a position in which the image hologram 40 can be sufficiently illuminated by light that is totally reflected within the light guide member 20 with an angle of reflection or an angle of refraction determined by the entrance optical member 30 and transmitted through the light guide member 20.

In a case in which the entrance optical member 30 is a transmissive type, the distance between the entrance optical member 30 and the image hologram 40 may be determined according to an angle of refraction of the light that is refracted while passing through the entrance optical member 30. For example, as illustrated in FIG. 2, the image hologram 40 may be disposed at a position in which a light ray P1 passing through one side of the entrance optical member 30 passes through one side of the image hologram 40 and a light ray P2 passing through the other side of the entrance optical member 30 passes through the other side of the image hologram 40. As another example, in a case in which the entrance optical member 30 is a reflective type, the distance between the entrance optical member 30 and the image hologram 40 may be determined according to an angle of reflection of the light that is reflected by the entrance optical member 30.

Accordingly, if the area 13 of the screen 11 corresponding to the entrance optical member 30, that is, the area 13 of screen 11 positioned below the entrance optical member 30, emits light, a three-dimensional holographic image 50 stored in the image hologram 40 is displayed above the image hologram 40.

In detail, if the area 13 of the screen 11 directly below the entrance optical member 30 is turned on, light L is radiated in random directions from the corresponding area 13 of the screen 11 toward the entrance optical member 30. When the light L emitted from the screen 11 passes through the entrance optical member 30 disposed on the bottom surface 22 of the light guide member 20, as illustrated in FIG. 2, the light L is refracted by a predetermined angle and is introduced into the light guide member 20. The light passed transmitted the entrance optical member 30 is refracted and made parallel, and then travels within the light guide member 20. The parallel light transmitted through the entrance optical member 30 is totally internally reflected at the upper and lower surfaces 21 and 22 of the light guide member 20, and thus travels within the light guide member 20 toward the image hologram 40.

The parallel light is emitted outside the light guide member 20 through a portion of the top surface 21 of the light guide member 20 on which the image hologram 40 is disposed, and then passes through the image hologram 40. When the light passes through the image hologram 40, as illustrated in FIGS. 1 and 2, a three-dimensional holographic image 50 is displayed above the image hologram 40.

Hereinafter, a mobile device 1 having a flip cover 100 with which a light guide member 20, equipped with an image hologram 40 and an entrance optical member 30 integrally is disposed, will be described with reference to FIGS. 3 through 5.

Figure 3:
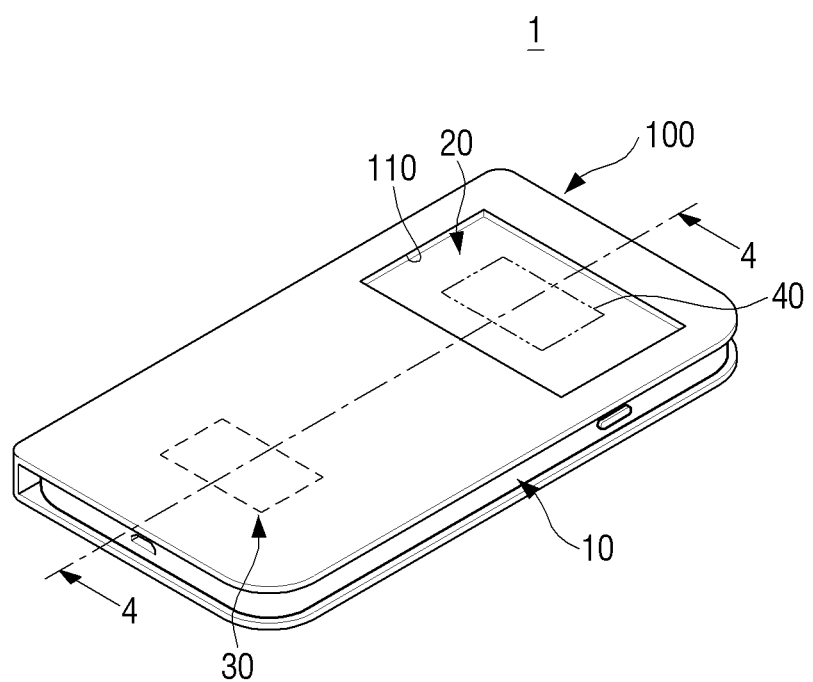
FIG. 3 is a perspective view illustrating a mobile device capable of displaying a hologram according to an exemplary embodiment.
Figure 4:
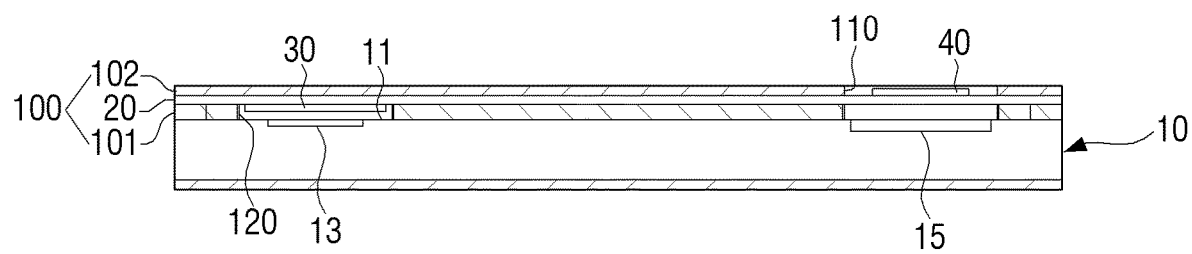
FIG. 4 is a cross-sectional view illustrating the mobile device capable of displaying a hologram of FIG. 3 taken along a line 4-4.

FIG. 3 is a perspective view illustrating a mobile device capable of displaying a hologram according to an exemplary embodiment, and FIG. 4 is a cross-sectional view illustrating the mobile device capable of displaying a hologram of FIG. 3 taken along a line 4-4. FIG. 5 is a perspective view illustrating the mobile device capable of displaying a hologram of FIG. 3 when a flip cover thereof is open.

Figure 5:
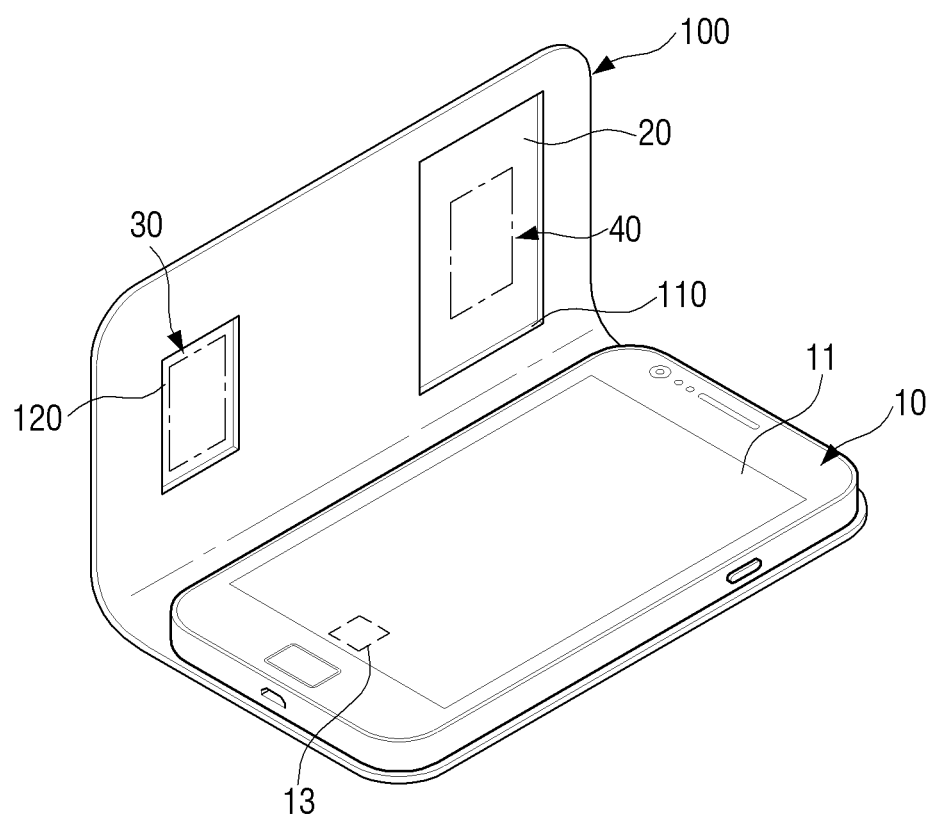
FIG. 5 is a perspective view illustrating the mobile device capable of displaying a hologram of FIG. 3 when a flip cover thereof is open.

Referring to FIGS. 3, 4, and 5, a mobile device 1 capable of displaying a hologram according to an exemplary embodiment may include a main body 10 and a flip cover 100.

The main body 10 may include a screen 11, disposed on an upper surface of the main body 10, and a controller (not illustrated) disposed within the main body 10.

The flip cover 100 can alternately substantially cover or expose the screen 11 of the main body 10. The flip cover 100 includes an opening 110 through which a portion of the screen 11 is exposed and can be seen even when the screen 11 is covered by the flip cover 100—i.e. when the flip cover is closed. The flip cover 100 may have a plurality of layers 101, 20, and 102, and an intermediate layer of the flip cover 100 may be a light guide member 20. In the present embodiment, the flip cover 100 has three layers 101, 20, and 102; the intermediate layer 20 is a light guide member; and a top layer 102 and a bottom layer 101 may be formed of a material (e.g., plastic, leather, etc.) commonly used for manufacturing flip covers. The image hologram 40 is disposed on a portion of the light guide member 20 corresponding to the opening 110 of the flip cover 100. Further, as illustrated in FIGS. 3, 4, and 5, an entrance optical member 30 is disposed on a portion of the light guide member 20 which is laterally spaced apart by a predetermined distance from the image hologram 40. The entrance optical member 30 is disposed at a position in which light output by the screen 11 can properly illuminate the image hologram 40. A portion 120 of the bottom layer 102 of the flip cover 100 corresponding to the entrance optical member 30 disposed on the light guide member 20 is removed so that the light emitted from the screen 11 can enter the entrance optical member 30.

In FIG. 4, in order to illustrate the structure of the flip cover 100 and the light guide member 20, the thicknesses of the flip cover 100 and of the light guide member 20 are exaggerated as compared to the thickness of the main body 10. Also, FIG. 4 illustrates a case in which the thickness of the entrance optical member 30 is thinner than the thickness of the bottom layer 101 of the flip cover 100 so that the entrance optical member 30 is spaced apart by a predetermined distance from the screen 11. However, although not illustrated, if the thickness of the entrance optical member 30 is the same as the thickness of the bottom layer 101 of the flip cover 100, the entrance optical member 30 may be in contact with the screen 11. In other words, the entrance optical member 30 may be disposed to be in contact with or spaced apart from the screen 11, but, in any case, the entrance optical member 30 may be formed so that the entrance optical member 30 turns the light emitted from the screen 11 into parallel light refracted at a certain angle transmitted into the light guide member 20.

In the present embodiment, the image hologram 40 is disposed on the upper surface 21 of the light guide member 20, and the entrance optical member 30 is disposed on the bottom surface 22 of the light guide member 20. However, the installation positions of the image hologram 40 and the entrance optical member 30 are not limited thereto. The image hologram 40 and the entrance optical member 30 may be disposed at any of a variety of positions. The installation position of the image hologram 40 and of the entrance optical member 30 with respect to the light guide member 20 will be described further in detail later.

In a case in which the light guide member 20, provided with the image hologram 40 and the entrance optical member 30, is disposed integrally with the flip cover 100 as described above, when the area 13 of the screen 11 capable of emitting a light toward the entrance optical member 30 is turned on, a three-dimensional holographic image 50 stored in the image hologram 40 is displayed.

The structures and operations of the light guide member 20, the entrance optical member 30, and the image hologram 40 disposed in the flip cover 100 are the same as those of the above described embodiment; therefore, additional detailed descriptions thereof are omitted.

The turning on of the predetermined area 13 of the screen 11 corresponding to the entrance optical member 30 may be performed by the controller (not illustrated) disposed in the main body 10 of the mobile device 1. If a specific event occurs in the mobile device 1, the controller may turn on the predetermined area 13 of the screen 11 so as to display the holographic image 50. In other words, it may be set so that the display of the holographic image 50 may be coordinated with a specific event of the mobile device 1. For example, in a case in which the mobile device 1 is a device that can perform a communication function, such as a smart phone capable of calling, when a call comes from a specific person, the controller may turn on the predetermined area 13 of the screen 11 in order to display the holographic image 50. Alternatively, when a call comes from a person belonging to a particular group, the holographic image 50 may be set to be displayed.

In a case in which the screen 11 of the mobile device 1 can emit monochromatic light in any of various colors, the holographic 50 may be coordinated with the number of people or groups corresponding to the number of colors that can be emitted by the mobile device 1. For example, a first region 131 (see FIG. 1) to emit a red light, a second region 132 (see FIG. 1) to emit a blue light, and a third region 133 (see FIG. 1) to emit a green light are included in the area 13 of the screen 11 corresponding to the entrance optical member 30. The first region 131 may be coordinated with the user's family, the second region 132 may be coordinated with the user's friends, and the third region 133 may be coordinated with the user's company. Thus, if a call comes from the family, the first region 131 of the screen 11 emits light so that a red holographic image 50 is displayed. If a call comes from the friends, the second region 132 of the screen 11 emits light so that a blue holographic image 50 is displayed. If a call comes from the company, the third region 133 of the screen 11 emits light so that a green holographic image 50 is displayed.

Figure 6:
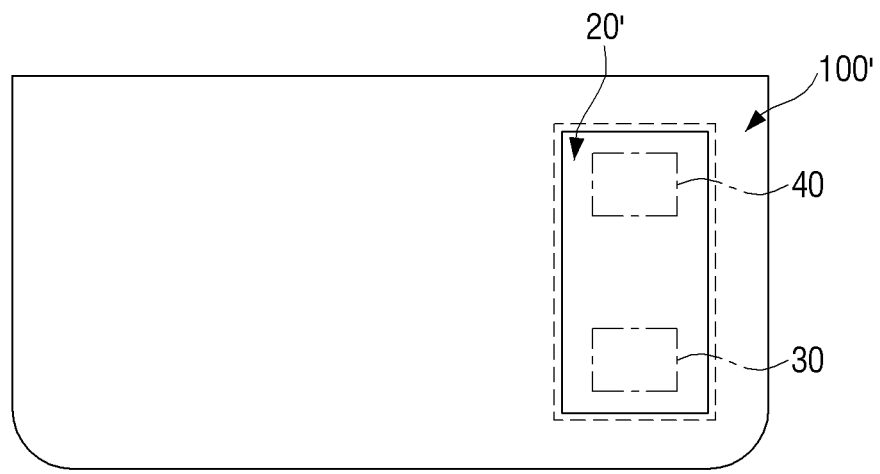
FIG. 6 is a plan view illustrating a mobile device capable of displaying a hologram according to another exemplary embodiment.

According to another exemplary embodiment, as illustrated in FIG. 6, a light guide member 20' may have a size corresponding to an opening 110 of a flip cover 100'. In other words, the light guide member 20' may be disposed only in an area corresponding to the opening 110 of the flip cover 100'. In this case, the entrance optical member 30 and the image hologram 40 are disposed on the light guide member 20' as described with respect to the above-described embodiment.

In a case of a mobile device 1' as illustrated in FIG. 6, while the size of the light guide member 20' is smaller than the size of the light guide member 20 of the mobile device 1 as illustrated in FIG. 3, the structures and functions of the light guide member 20' and the image hologram 40 and entrance optical member 30 disposed on the light guide member 20' and the operation of the screen 11 are the same as those of the above-described embodiment. Therefore, additional detailed descriptions thereof are omitted.

Figure 7:
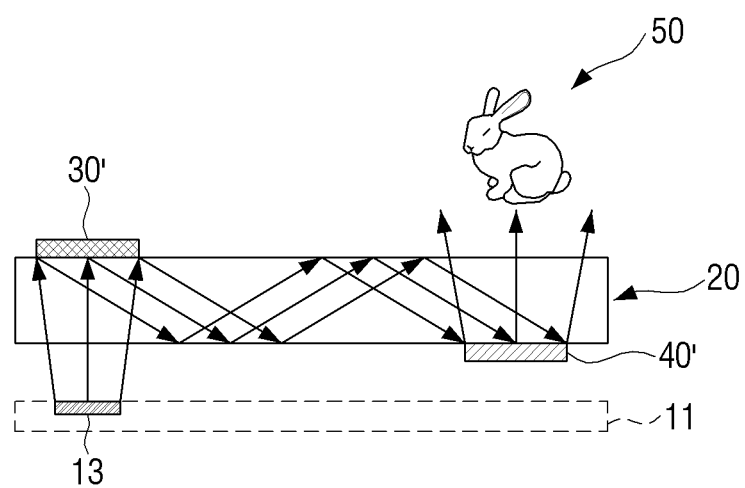
FIGS. 7, 8, and 9 are views for explaining various arrangements of an entrance optical member and an image hologram in a mobile device capable of displaying a hologram according to exemplary embodiments.
Figure 8:
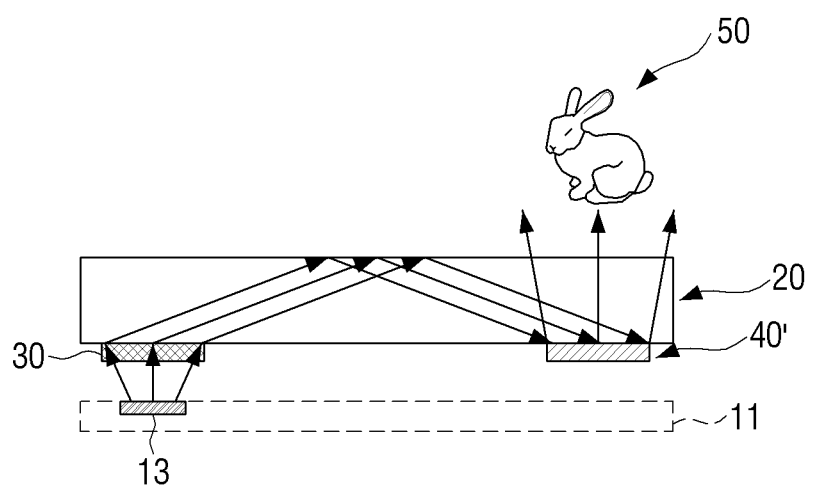
Figure 9:
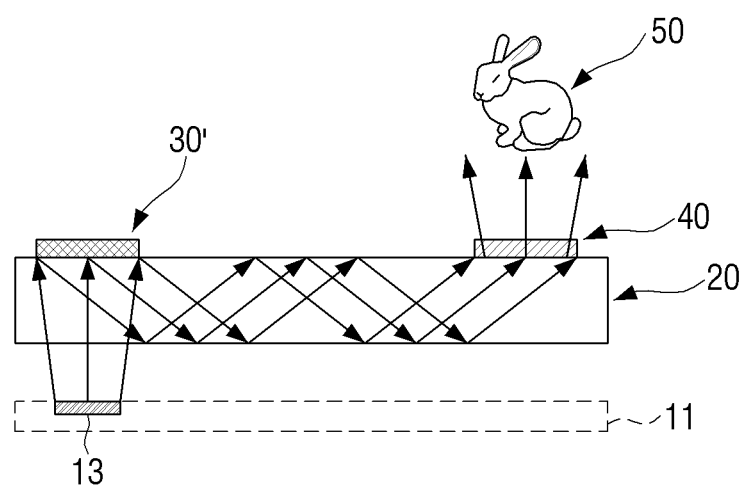

FIGS. 7, 8, and 9 are views for explaining various arrangements of an entrance optical member and an image hologram in a mobile device capable of displaying a hologram according to exemplary embodiments.

Hereinafter, arrangements, different from the arrangement of the entrance optical member 30 and the image hologram 40 with respect to the light guide member 20 as illustrated in FIGS. 1 and 2, will be described with reference to FIGS. 7 through 9.

The entrance optical member 30 and the image hologram 40 may be disposed on the same surface of the light guide member 20 or on opposite surfaces of the light guide member 20.

FIGS. 2 and 7 illustrate cases in which the entrance optical member 30 and 30' and the image hologram 40 and 40' are disposed on opposite surfaces of the light guide member 20. FIGS. 8 and 9 illustrate cases in which the entrance optical member 30 and 30' and the image hologram 40 and 40' are disposed on the same surface of the light guide member 20.

In the case of FIG. 2, the entrance optical member 30 is disposed on the bottom surface 22 of the light guide member 20, and the image hologram 40 is disposed on the upper surface 21 of the light guide member 20. In this case, the entrance optical member 30 is a transmissive hologram optical element, and the image hologram 40 is a transmissive hologram. Accordingly, light emitted from the screen 11 is refracted while passing through the transmissive entrance optical member 30, and is then introduced into the light guide member 20. The light introduced into the light guide member 20 travels toward the image hologram 40 while being totally internally reflected within the light guide member 20, and then illuminates the image hologram 40. As the image hologram 40 is a transmissive type, when the light passes through the image hologram 40, a three-dimensional holographic image 50 stored in the image hologram 40 is displayed above the image hologram 40.

In a case of FIG. 7, the entrance optical member 30' is disposed on the upper surface 21 of the light guide member 20, and the image hologram 40' is disposed on the bottom surface 22 of the light guide member 20. In this case, the entrance optical member 30' is a reflective hologram optical element, and the image hologram 40' is a reflective hologram. Accordingly, light emitted from the screen 11 is introduced into the light guide member 20, reflected at a predetermined angle by the reflective entrance optical member 30', and then becomes parallel light directed toward the image hologram 40'. The light reflected by the entrance optical member 30' travels to the image hologram 40' while being totally internally reflected within the light guide member 20, and then illuminates the image hologram 40'. Since the image hologram 40' is a reflective type, when the light is reflected by the image hologram 40', a three-dimensional holographic image 50 stored in the image hologram 40' is displayed above the light guide member 20.

In a case of FIG. 8, the entrance optical member 30 and the image hologram 40' are disposed on the bottom surface 22 of the light guide member 20. In this case, the entrance optical member 30 is a transmissive hologram optical element, and the image hologram 40' is a reflective hologram. Accordingly, light emitted from the screen 11 is refracted by the transmissive entrance optical member 30, becomes parallel light, and i transmitted at a predetermined angle into the light guide member 20. The light introduced into the light guide member 20 travels toward the image hologram 40' while being totally internally reflected within the light guide member 20, and then illuminates the image hologram 40'. Since the image hologram 40' is a reflective type, when the light is reflected on the image hologram 40', a three-dimensional holographic image 50 stored in the image hologram 40' is displayed above the light guide member 20.

In a case of FIG. 9, the entrance optical member 30' and the image hologram 40 are disposed on the upper surface 21 of the light guide member 20. In this case, the entrance optical member 30' is a reflective hologram optical element, and the image hologram 40 is a transmissive hologram. Accordingly, light emitted from the screen 11 is introduced into the light guide member 20, is reflected at a predetermined angle by the reflective entrance optical member 30', and becomes a parallel light transmitted toward the image hologram 40. The light reflected at the predetermined angle by the entrance optical member 30' travels to the image hologram 40 while being totally internally reflected by the light guide member 20, and then illuminates the image hologram 40. Since the image hologram 40 is a transmissive type, when the light passes through the image hologram 40, a three-dimensional holographic image 50 stored in the image hologram 40 is displayed above the image hologram 40.

So far, cases in which a mobile device 1, capable of displaying a hologram, displays a monochromatic holographic image 50 have been described. However, the mobile device 1 may alternately be configured to display a color holographic image 50.

In order to display a color holographic image 50, the mobile device 1 is configured so that light of at least two different colors is introduced into the light guide member 20 through at least two different entrance optical members and illuminates a single color image hologram 40.

Figure 10:
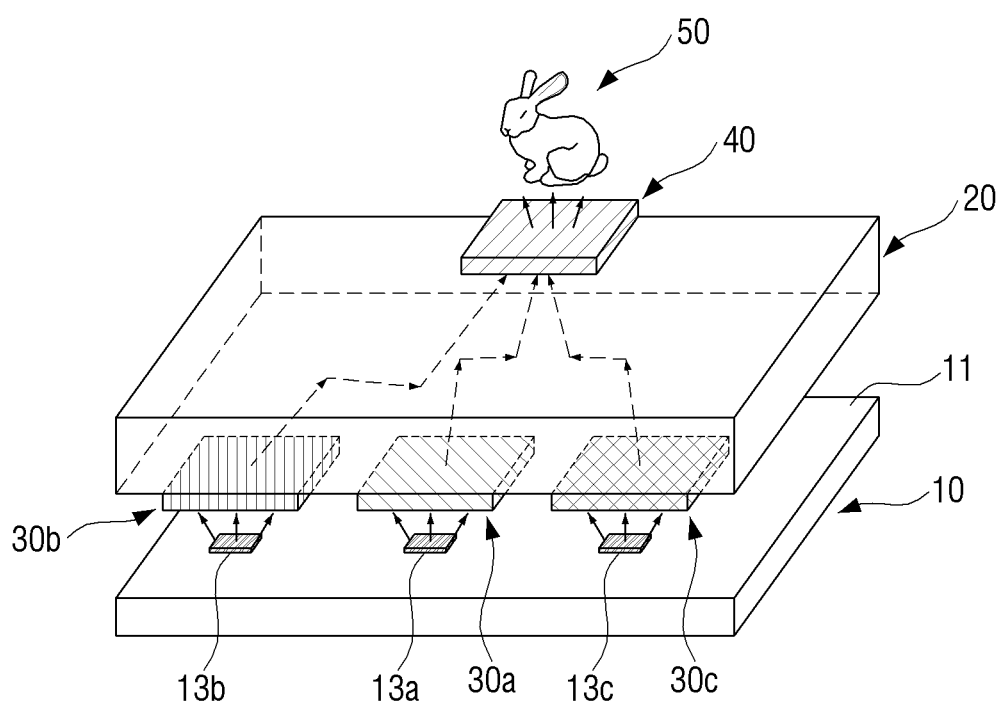
FIG. 10 is a perspective view conceptually illustrating a mobile device capable of displaying a hologram that can display a color holographic image according to an exemplary embodiment.

FIG. 10 is a perspective view conceptually illustrating a mobile device capable of displaying a color holographic image according to an exemplary embodiment.

Referring to FIG. 10, an image hologram 40 is disposed on an upper surface of the light guide member 20, and three entrance optical members 30a, 30b, and 30c are disposed on a bottom surface of the light guide member 20.

The image hologram 40 stores a three-dimensional color holographic image 50, and is a transmissive type. Accordingly, if the proper light illuminates the image hologram 40, a three-dimensional color holographic image 50 is displayed.

The three entrance optical members 30a, 30b, and 30c may include an entrance optical member for red light 30a, an entrance optical member for blue light 30b, and an entrance optical member for green light 30c to refract red light, blue light, and green light, respectively. Also, each of the three entrance optical members 30a, 30b, and 30c is a transmissive type so that light passing through each of the three entrance optical members 30a, 30b, and 30c becomes a parallel light refracted at a predetermined angle. The three entrance optical members 30a, 30b, and 30c are formed so that light transmitted through each of three entrance optical members 30a, 30b, and 30c travels toward the single image hologram 40. Light emitted from each of portions 13a, 13b, and 13c of the screen 11, respectively below the three entrance optical members 30a, 30b, and 30c, is introduced into the three entrance optical members 30a, 30b, and 30c. Since each of the three entrance optical members 30a, 30b, and 30c is configured to transmit monochromatic light, in order to display a color holographic image 50, the three entrance optical members 30a, 30b, and 30c need to be supplied with light of three different colors, that is, red light, blue light, and green light, respectively. Accordingly, the three portions 13a, 13b, and 13c of the screen 11 positioned below the three entrance optical members 30a, 30b, and 30c are controlled to emit red light, blue light, and green light, respectively.

In detail, when a portion 13a of the screen 11, corresponding to the entrance optical member for a red light 30a, is turned on, red light is emitted from the portion 13a of the screen 11 and then is incident on the entrance optical member for red light 30a. Thus, the red light transmitted through the entrance optical member for red light 30a travels to the image hologram 40 while being totally internally reflected within the light guide member 20. When a portion 13b of the screen 11 corresponding to the entrance optical member for blue light 30b is turned on, blue light is emitted from the portion 13b of the screen 11 and then is incident on the entrance optical member for a blue light 30b. Thus, the blue light transmitted through the entrance optical member for blue light 30b travels to the image hologram 40 while being totally internally reflected within the light guide member 20. Further, when a portion 13c of the screen 11 corresponding to the entrance optical member for green light 30c is turned on, green light is emitted from the portion 13c of the screen 11 and then is incident on the entrance optical member for green light 30c. Thus, the green light transmitted through the entrance optical member for a green light 30c travels to the image hologram 40 while being totally internally reflected within the light guide member 20. When the red light, the blue light, and the green light incident on the image hologram 40 are transmitted through the image hologram 40, a three-dimensional color holographic image 50 is displayed above the image hologram 40.

In the above description, a case in which the image hologram 40 is disposed on the upper surface of the light guide member 20 and the three entrance optical members 30a, 30b, and 30c are disposed on the bottom surface of the light guide member 20 is described. However, as another exemplary embodiment, the single image hologram 40 and the three entrance optical members 30a, 30b, and 30c may be disposed in any of various positions as illustrated in FIGS. 7 through 9.

Further, in the above description, the screen 11 supplies the three entrance optical members 30a, 30b, and 30c with red light, blue light, and green light, respectively. However, according to another exemplary embodiment, the screen 11 may be configured to supply all of the three entrance optical members 30a, 30b, and 30c with white light, and the three entrance optical members 30a, 30b, and 30c may be configured to respectively transmit red light, blue light, and green light.

Above, a case in which the light guide member 20 is provided with a single image hologram 40 is described. However, the light guide member 20 may be provided with a plurality of image holograms 40. If the light guide member 20 is provided with a plurality of image holograms 40, the light guide member 20 may also be provided with a corresponding number of entrance optical members 30.

Hereinafter, a mobile device, according to an exemplary embodiment, capable of selectively displaying one of a plurality of holographic images, will be described with reference to FIG. 11.

Figure 11:
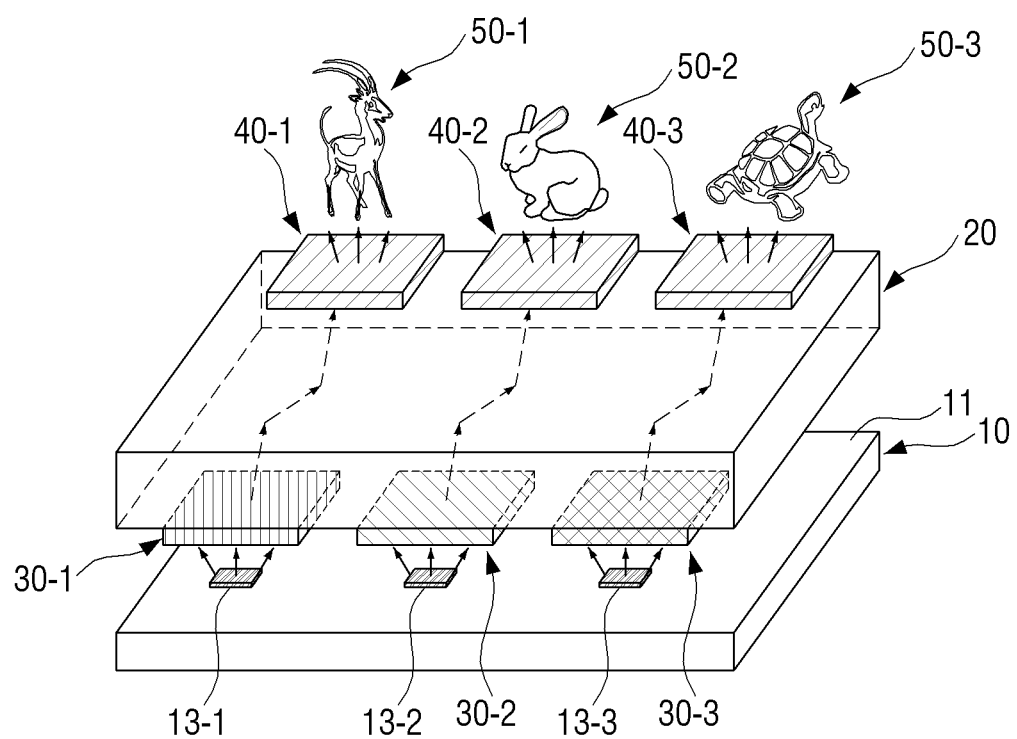
FIG. 11 is a perspective view conceptually illustrating a mobile device capable of displaying a hologram that can selectively display one of a plurality of holographic images according to an exemplary embodiment.

FIG. 11 is a perspective view conceptually illustrating a mobile device capable of selectively displaying one of a plurality of holographic images according to an exemplary embodiment.

Referring to FIG. 11, three image holograms 40-1, 40-2, and 40-3 are disposed on an upper surface of the light guide member 20, and three entrance optical members 30-1, 30-2, and 30-3 are disposed on a bottom surface of the light guide member 20.

The three image holograms 40-1, 40-2, and 40-3 store three-dimensional holographic images 50-1, 50-2, and 50-3, respectively, having three different shapes, and are transmissive types. Accordingly, when the appropriate light illuminates the three image holograms 40-1, 40-2, and 40-3, three different three-dimensional holographic images 50-1, 50-2, and 50-3 are respectively displayed by the three image holograms 40-1, 40-2, and 40-3. For example, as illustrated in FIG. 11, a first image hologram 40-1 may store a deer image 50-1, a second image hologram 40-2 may store a rabbit image 50-2, and a third image hologram 40 may store a turtle image 50-3. Accordingly, when the appropriate light illuminates the first, second, and third image holograms 40-1, 40-2, and 40-3, three-dimensional holographic images 50-1, 50-2, and 50-3 of a deer, a rabbit, and a turtle are respectively displayed by the first, second, and third image holograms 40-1, 40-2, and 40-3.

The three entrance optical members 30-1, 30-2, and 30-3 are disposed to correspond to the three image holograms 40-1, 40-2, and 40-3. Accordingly, lights transmitted through the three entrance optical members 30-1, 30-2, and 30-3 is supplied to the corresponding three image holograms 40-1, 40-2, and 40-3.

In detail, light transmitted through the first entrance optical member 30-1 illuminates the first image hologram 40-1. If a first screen area 13-1, positioned below the first entrance optical member 30-1, is turned on, first light is emitted. The first light emitted from the first screen area 13-1 becomes first parallel light refracted by the first entrance optical member 30-1 and transmitted at a predetermined angle, and thus the first parallel light is made incident on the first image hologram 40-1. When the first parallel light is transmitted through the first image hologram 40-1, a first holographic image 50-1 stored in the first image hologram 40-1 is displayed.

Light transmitted through the second entrance optical member 30-2 illuminates the second image hologram 40-2. If a second screen area 13-2, positioned below the second entrance optical member 30-2, is turned on, second light is emitted. The second light emitted from the second screen area 13-2 becomes second parallel light refracted by the second entrance optical member 30-2, and thus the second parallel light is made incident on the second image hologram 40-2. When the second parallel light is transmitted through the second image hologram 40-2, a second holographic image 50-2 stored in the second image hologram 40-2 is displayed.

Light transmitted through the third entrance optical member 30-3 illuminates the third image hologram 40-3. If a third screen area 13-3, positioned below the third entrance optical member 30-3, is turned on, third light is emitted. The third light emitted from the third screen area 13-3 becomes third parallel light refracted by the third entrance optical member 30-3, and thus the third parallel light is made incident on the third image hologram 40-3. When the third parallel light is transmitted through the third image hologram 40-3, a third holographic image 50-3 stored in the third image hologram 40-3 is displayed.

The three image holograms 40-1, 40-2, and 40-3 may be configured so that the three image holograms 40-1, 40-2, and 40-3 are respectively coordinated with three specific events that may occur in the mobile device 1. For example, if the mobile device 1 is a smart phone, the three image holograms 40-1, 40-2, and 40-3 may be coordinated with phone reception. The three image holograms 40-1, 40-2, and 40-3 may respectively be coordinated with three specific persons or three specific groups, and thus if a call comes from one of the three specific persons or people belonging to one of the three specific groups, a corresponding image hologram 40-1, 40-2, or 40-3 may be displayed. For example, if a call is received from a specific person that is coordinated with the first image hologram 40-1, a controller of the mobile device 1 turns on the first screen area 13-1 corresponding to the first image hologram 40-1, thereby displaying the first holographic image 50-1.

In the above description, a case in which three image holograms and entrance optical members are disposed on the light guide member is described. However, the number of the image holograms and the entrance optical members are not limited thereto. The light guide member may be provided with two or four or more image holograms and entrance optical members if desired.

Further, in the above description, a case in which a plurality of image holograms is disposed on the upper surface of the light guide member and a plurality of entrance optical members is disposed on the bottom surface of the light guide member is described. However, the plurality of image holograms and entrance optical members may be arranged in any of various ways as illustrated in FIGS. 7 through 9.

Hereinafter, a hologram display method according to an exemplary embodiment usable with a mobile device as described above will be described with reference to FIG. 12.

Figure 12:
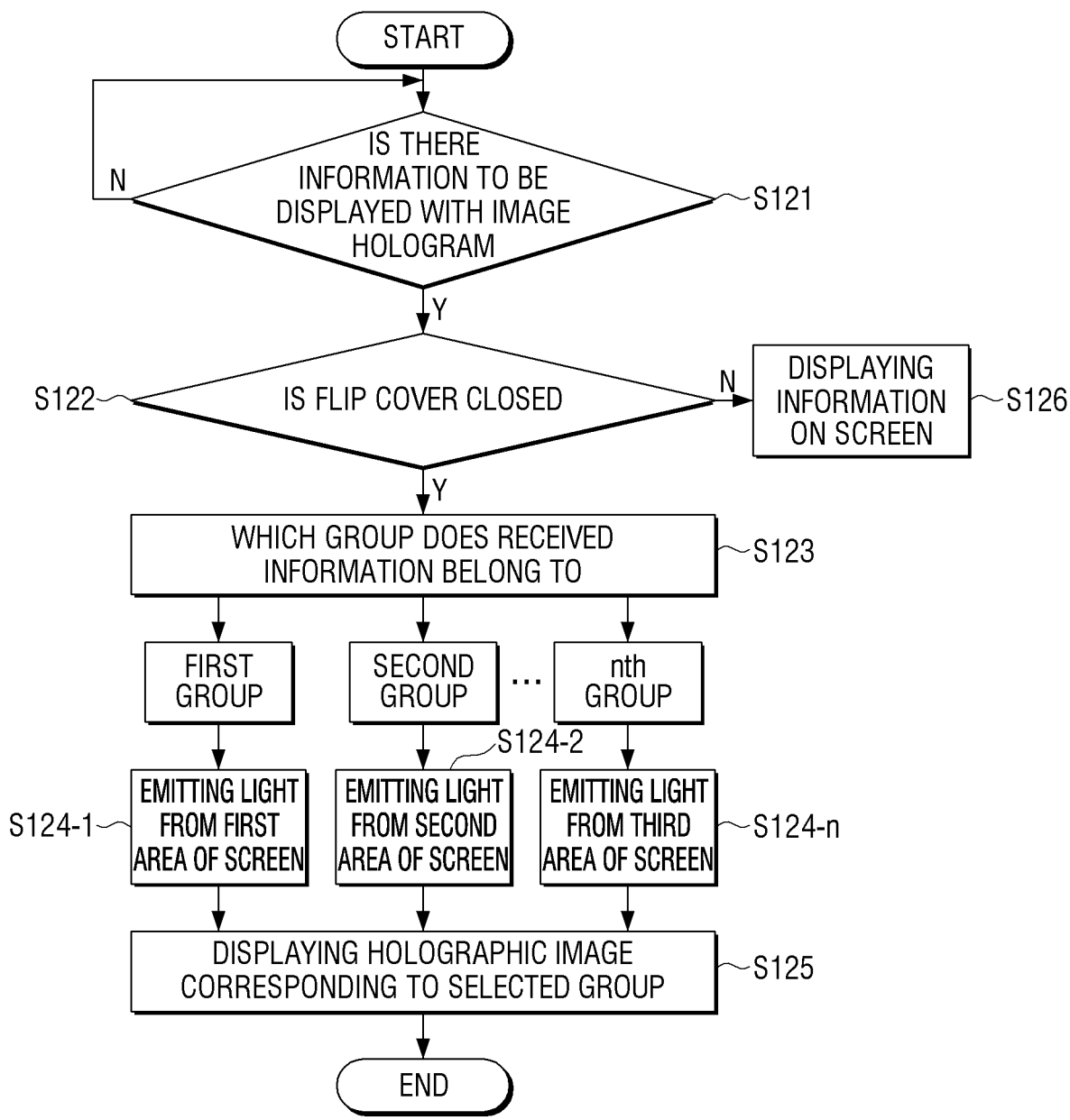
FIG. 12 is a flowchart for explaining a hologram display method according to an exemplary embodiment.

FIG. 12 is a flowchart for explaining a hologram display method according to an exemplary embodiment.

A controller of the mobile device determines whether there is information to be displayed with an image hologram (S121). For example, if display of the image hologram is coordinated with phone reception, the controller determines whether a call is received from a specific person or a person belonging to a specific group corresponding to the image hologram.

If there is information to be displayed with the image hologram, the controller determines a status of a flip cover (S122). For example, in a case in which the display of the image hologram is configured to correspond with phone reception, when a call is received from a specific person or a person belonging to a specific group corresponding to the image hologram, the controller determines whether the flip cover covers the screen or not, that is, whether the flip cover is closed or not.

If the flip cover is not closed, that is, if the flip cover is open, the controller displays the corresponding information on the screen of the mobile device (S126).

If the flip cover covers the screen, that is, if the flip cover is closed, the controller determines which group the received information belongs to (S123). In other words, the controller determines which group of a first group, a second group, . . . , a nth group the received information belongs to.

If the received information belongs to the first group, the controller controls a first area of the screen to emit light (S124-1).

The controller of the mobile device controls predetermined areas of the screen, that is, screen areas corresponding to entrance optical members, to emit light (S124-1, S124-2, and S124-n).

The light emitted from the first area of the screen is made parallel light by being refracted at a predetermined angle while being transmitted through the entrance optical member corresponding to the first area, and thus travels to an image hologram through a light guide member. When the parallel light illuminates the image hologram, a three-dimensional holographic image stored in the image hologram is displayed (S125). In other words, the holographic image corresponding to the received information is displayed.

If the received information belongs to the second group, the controller controls a second area of the screen to emit a light. Thus, a holographic image corresponding to the second area is displayed.

Likewise, if the received information belongs to the nth group, the controller controls an nth area of the screen to emit a light. Thus, a holographic image corresponding to the nth area is displayed.

With a mobile device capable of displaying a hologram according to an exemplary embodiment, because a screen of the mobile device is used as a light emitting source, a separate light source is not required. Therefore, it can be applied to mobile devices.

Also, with a mobile device capable of displaying a hologram according to an exemplary embodiment, even though a single image hologram is used, holographic images in a plurality of colors can be displayed to correspond to a plurality of specific events. Therefore, a variety of information can be provided to users using holographic images.

While exemplary embodiments have been described, additional variations and modifications of the embodiments may occur to those skilled in the art once they learn of the basic inventive concepts. Therefore, it is intended that the appended claims shall be construed to include both the above embodiments and all such variations and modifications that fall within the spirit and scope of the inventive concepts.

What is claimed is:

1. A mobile device comprising:
a main body comprising a screen, a planar surface of the screen comprising a first pixel area and a second pixel area that is different from the first pixel area;
a light guide member longitudinally spaced apart from the screen and disposed above the first pixel area of the screen and the second pixel area of the screen;
an entrance optical member longitudinally spaced apart from the screen and disposed on the light guide member; and
an image hologram, laterally spaced apart from the entrance optical member, longitudinally spaced apart from the screen and disposed on the light guide member at a position corresponding to the second pixel area of the screen,
wherein the first pixel area of the screen is disposed such that light emitted from the first pixel area of the screen is incident on the entrance optical member, is transmitted through the light guide member, and is incident on the image hologram, thereby displaying a holographic image stored in the image hologram above the image hologram, and
wherein the planar surface of the screen is substantially parallel to a surface of the light guide member.

2. The mobile device as claimed in claim 1, further comprising:
a flip cover configured to substantially cover the screen in a closed position and to expose the screen in an open position,
wherein:
the flip cover has an opening therein,
the light guide member is disposed within the flip cover, and
the image hologram is disposed on a portion of the light guide member corresponding to the opening of the flip cover.

3. The mobile device as claimed in claim 2, wherein a size of the light guide member is the same as a size of the opening in the flip cover.

4. The mobile device as claimed in claim 1, wherein the entrance optical member and the image hologram are disposed on the same surface of the light guide member.

5. The mobile device as claimed in claim 4, wherein the entrance optical member and the image hologram are disposed on a bottom surface of the light guide member, and
wherein the entrance optical member is a transmissive hologram optical element, and the image hologram is a reflective hologram.

6. The mobile device as claimed in claim 4, wherein the entrance optical member and the image hologram are disposed on an upper surface of the light guide member, and
wherein the entrance optical member is a reflective hologram optical element, and the image hologram is a transmissive hologram.

7. The mobile device as claimed in claim 1, wherein the entrance optical member is disposed on a first surface of the light guide member and the image hologram is disposed on a second surface of the light guide member, opposite the first surface.

8. The mobile device as claimed in claim 7, wherein the entrance optical member is disposed on a bottom surface of the light guide member, and the image hologram is disposed on an upper surface of the light guide member, and
wherein the entrance optical member is a transmissive hologram optical element, and the image hologram is a transmissive hologram.

9. The mobile device as claimed in claim 7, wherein the entrance optical member is disposed on an upper surface of the light guide member, and the image hologram is disposed on a bottom surface of the light guide member, and
wherein the entrance optical member is a reflective hologram optical element, and the image hologram is a reflective hologram.

10. The mobile device as claimed in claim 1, wherein the entrance optical member comprises at least one of a hologram optical element, a diffraction grating, and a prismatic sheet.

11. The mobile device as claimed in claim 1, wherein the image hologram stores a complete three-dimensional holographic image.

12. The mobile device as claimed in claim 1, wherein the entrance optical member comprises at least two entrance optical elements.

13. The mobile device as claimed in claim 12, wherein the image hologram stores a color image, and
the at least two entrance optical elements comprise an entrance optical element which refracts red light, an entrance optical element which refracts blue light, and an entrance optical element which refracts green light.

14. The mobile device as claimed in claim 1, wherein the image hologram comprises a plurality of image holograms, and
the entrance optical member comprises a plurality of entrance optical members corresponding to the plurality of image holograms.

15. The mobile device as claimed in claim 14, further comprising:
a controller, wherein:
the plurality of image holograms are coordinated with a plurality of specific events, such that upon the occurrence of one of the plurality of specific events, the controller controls a coordinated one of the plurality of image holograms to be displayed.

16. The mobile device as claimed in claim 1, wherein the image hologram is transparent.

17. The mobile device as claimed in claim 1, wherein the entrance optical member is interposed between the light guide member and the first pixel area of the screen.

18. The mobile device as claimed in claim 17, wherein the second pixel area of the screen is configured to display an image that is viewable through the image hologram and the light guide member.

19. A hologram display device comprising:
a screen configured to emit light, a planar surface of the screen comprising a first pixel area and a second pixel area that is different from the first pixel area;
a light guide member longitudinally spaced apart from the screen and disposed above the first pixel area of the screen and the second pixel area of the screen;
an entrance optical member longitudinally spaced apart from the screen and disposed on a surface of the light guide member;
an image hologram, longitudinally spaced apart from the screen and disposed on a surface of the light guide member at a position corresponding to the second pixel area of the screen;
wherein the entrance optical member and the image hologram are configured such that light emitted from the first pixel area of the screen is incident on the entrance optical member, is transmitted through the light guide member by total internal reflection, and is incident on the image hologram, thereby displaying a holographic image stored in the image hologram above the image hologram, and
wherein the planar surface of the screen is substantially parallel to a surface of the light guide member.

* * * * *